United States Patent
Corson et al.

(10) Patent No.: US 8,665,734 B2
(45) Date of Patent: Mar. 4, 2014

(54) METHODS AND APPARATUS FOR UPLINK MACRO-DIVERSITY IN PACKET-SWITCHED CELLULAR NETWORKS

(75) Inventors: M. Scott Corson, Chatham, NJ (US);
Samir Kapoor, Doylestown, PA (US);
Rajiv Laroia, Basking Ridge, NJ (US);
Vincent Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1241 days.

(21) Appl. No.: 10/429,627

(22) Filed: May 5, 2003

(65) Prior Publication Data
US 2004/0008630 A1 Jan. 15, 2004

Related U.S. Application Data

(60) Provisional application No. 60/441,577, filed on Jan. 21, 2003, provisional application No. 60/380,082, filed on May 6, 2002.

(51) Int. Cl.
*H04J 3/16* (2006.01)
*H04W 28/06* (2009.01)

(52) U.S. Cl.
CPC .................................... *H04W 28/06* (2013.01)
USPC ............................ 370/252; 370/394; 370/470

(58) Field of Classification Search
USPC ......... 370/394, 252, 253, 464, 465, 468, 470, 370/471, 474, 476
See application file for complete search history.

(56) References Cited

U.S. PATENT DOCUMENTS

| | | | |
|---|---|---|---|
| 5,103,459 A | | 4/1992 | Gilhousen et al. |
| 5,507,035 A | * | 4/1996 | Bantz et al. .................. 455/133 |
| 5,901,362 A | | 5/1999 | Cheung et al. |
| 5,978,365 A | | 11/1999 | Yi |
| 6,005,855 A | | 12/1999 | Zehavi et al. |
| 6,112,088 A | | 8/2000 | Haartsen |
| 6,160,999 A | | 12/2000 | Chheda et al. |

(Continued)

FOREIGN PATENT DOCUMENTS

| | | |
|---|---|---|
| CN | 1369187 | 9/2002 |
| EP | 0622911 | 11/1994 |

(Continued)

OTHER PUBLICATIONS

PCT International Search Report, for International Application No. PCT/US03/13996, May 5, 2003.

(Continued)

*Primary Examiner* — Pao Sinkantarakorn
(74) *Attorney, Agent, or Firm* — Raphael Freiwirth

(57) ABSTRACT

A method and apparatus for providing uplink macro-diversity in packet-switched networks that allows packets and/or portions of packets, e.g., frames, to be selectively sent from an end node, e.g., wireless communication device or mobile terminal, over a set of multiple communication connections, e.g., physical-layer or link-layer connections, to one or more access nodes, e.g., base stations. Uplink macro-diversity is achieved in part through intelligent selective forwarding over multiple communication connections, where the forwarding decision is controlled by the end node based on a variety of factors, e.g., physical-layer channel conditions and/or higher layer policy. The forwarding decision is executed on a rapid timescale, e.g., on a per packet basis, to adapt to the dynamically varying conditions of the set of communication connections.

50 Claims, 6 Drawing Sheets

(56) References Cited

U.S. PATENT DOCUMENTS

| | | | |
|---|---|---|---|
| 6,212,633 | B1 | 4/2001 | Levy et al. |
| 6,216,004 | B1 | 4/2001 | Tiedemann, Jr. et al. |
| 6,359,865 | B1 * | 3/2002 | Toskala et al. .............. 370/329 |
| 6,381,458 | B1 | 4/2002 | Frodigh et al. |
| 6,477,670 | B1 | 11/2002 | Ahmadvand |
| 6,487,393 | B1 * | 11/2002 | Davenport et al. .......... 455/67.7 |
| 6,487,406 | B1 * | 11/2002 | Chang et al. ............... 455/422.1 |
| 6,542,490 | B1 * | 4/2003 | Ahmadvand et al. ........ 370/338 |
| 6,611,231 | B2 * | 8/2003 | Crilly et al. .................. 342/378 |
| 6,636,498 | B1 | 10/2003 | Leung |
| 6,639,898 | B1 | 10/2003 | Dutta et al. |
| 6,891,832 | B1 * | 5/2005 | Chien et al. ................ 370/395.1 |
| 6,940,869 | B1 * | 9/2005 | Wang et al. .................. 370/466 |
| 7,042,858 | B1 | 5/2006 | Ma et al. |
| RE39,381 | E * | 11/2006 | Hakkinen et al. ............. 455/525 |
| 7,574,351 | B2 | 8/2009 | Anandakumar et al. |
| 7,623,477 | B2 | 11/2009 | Corson et al. |
| 2002/0075873 | A1 | 6/2002 | Lindhorst-Ko et al. |
| 2002/0086692 | A1 | 7/2002 | Chheda et al. |
| 2002/0087716 | A1 * | 7/2002 | Mustafa ...................... 709/236 |
| 2002/0181437 | A1 | 12/2002 | Ohkubo et al. |
| 2003/0039250 | A1 * | 2/2003 | Nichols et al. ................ 370/394 |
| 2003/0043773 | A1 | 3/2003 | Chang |
| 2004/0047348 | A1 | 3/2004 | O'Neill |
| 2005/0068933 | A1 | 3/2005 | Kokkonen et al. |
| 2006/0182063 | A1 | 8/2006 | Ma et al. |
| 2010/0027476 | A1 | 2/2010 | Corson et al. |
| 2011/0228690 | A1 | 9/2011 | Corson et al. |

FOREIGN PATENT DOCUMENTS

| | | |
|---|---|---|
| EP | 1021874 | 7/2000 |
| EP | 1502122 | 2/2005 |
| RU | 2099871 C1 | 12/1997 |
| RU | 2121762 C1 | 11/1998 |
| RU | 2008111828 A | 10/2009 |
| WO | WO 9604734 A1 | 2/1996 |
| WO | WO 9913652 | 3/1999 |
| WO | WO 9967972 | 12/1999 |
| WO | WO 01/30039 | 4/2001 |
| WO | 2004068739 A1 | 8/2004 |

OTHER PUBLICATIONS

IEEE 802.11a "Part 11: Wireless LAN Medium Access Control (MAC) and Physical Layer (PHY) specifications High-speed Physical Layer in the 5 GHZ Band," 1999.

IEEE 802.11b: "Part 11: Wireless LAN Medium Access Control (MAC) and Physical Layer (PHY) Specifications: Higher-Speed Physical Layer Extension in the 2.4 GHz Band," 1999.

International Search Report—PCT/US2003/035256, International Search Authority—European Patent Office—May 12, 2004.

Supplementary European Search Report—EP03750062, Search Authority—Munich Patent Office, Jun. 10, 2010.

\* cited by examiner

METHODS AND APPARATUS FOR UPLINK MACRO-DIVERSITY IN PACKET-SWITCHED CELLULAR NETWORKS

CROSS REFERENCE TO RELATED APPLICATION

This application claims the benefit of U.S. Provisional Application No. 60/380,082, filed May 6, 2002 entitled: "METHODS AND APPARATUS FOR UPLINK MACRO-DIVERSITY IN PACKET-SWITCHED CELLULAR NETWORKS THROUGH INTELLIGENT, MULTILINK-INTERFACE PACKET FORWARDING, and U.S. Provisional Patent Application No. 60/441,577, filed Jan. 21, 2003 entitled: "METHODS AND APPARATUS FOR DOWNLINK MACRO-DIVERSITY IN PACKET-SWITCHED CELLULAR NETWORKS", each of which is hereby expressly incorporated by reference.

FIELD OF THE INVENTION

This invention relates to communication systems and, more particularly, to methods and apparatus for uplink macro-diversity in packet-switched cellular networks.

BACKGROUND

Existing Code Division Multiple Access (CDMA)-based cellular network technologies achieve what is often referred to as uplink macro-diversity through the use of the well-known "soft handoff" mechanism. In soft handoff mechanism, uplink frames at the link layer or Media Access Control (MAC) sublayer that are transmitted by a user's wireless communication device or mobile terminal are received at multiple base station transceivers as controlled by a separate controlling element, e.g., a Radio Network Controller (RNC) or Base Station Controller (BSC), which is typically more centrally located in the radio access network. The set of receiving base station transceivers forward the uplink frames to the controlling element, which then uses techniques such as frame selection or soft combining, as well as automatic repeat request (ARQ) mechanisms in an attempt to reconstruct and correctly receive the frames sent from the user's wireless communication device. This design has evolved primarily in support of circuit-switch applications, e.g., voice, and is not well-suited for packet-switched networking/internetworking. The concentration of information through the controlling element reduces network scalability and also increases the reliability requirements, and cost, of the controlling element. The design also imposes timing, synchronization, and communication latency requirements between the base station transceivers and/or between the base station transceivers and the controlling element.

These requirements are overly restrictive for many packet-switched network/internetwork technologies. In connectionless, packet-switched networks/internetworks such as those based on the Internet Protocol (IP), a sequence of packets (or packet flow) sent from a source node to a destination node need not follow the same path throughout the network/internetwork. It is also generally desirable to confine the dynamics of a specific air-link interface technology to the interface itself, thereby allowing network layer intelligence to be brought forward to the edge of the fixed infrastructure.

Internet Protocol Overview

IP technology is designed to enable packet-switched interconnection of a heterogeneous set of computer communication networks. A potentially diverse set of network and link layer technologies are interconnected through gateways (or routers) that provide a packet forwarding service. Information is transferred from sources to destinations as blocks of data called datagrams, where sources and destinations (or hosts) are identified by fixed length addresses. Routing in IP internetworks is connectionless in nature, in that datagrams are forwarded between routers on a hop-by-hop basis using the destination address in the datagram. Each router makes an independent next-hop forwarding decision using its own internal forwarding table. IP also provides for fragmentation and reassembly of long datagrams, if necessary, for transmission through "small packet" networks. In some IP internetworks there is relatively little distinction between hosts and routers. Herein, when no distinction is required the term "node" will be used. One distinction that generally holds true is that while any IP node may send and receive datagrams, only routers forward datagrams.

In a common case a host has only one connection (or interface) to the internetwork. When the interface is point-to-point in nature, the decision regarding the next-hop to which datagrams from the host should be sent is trivial. Typically, a default route designates the remote end of the point-to-point link as the next-hop for all outgoing datagrams from the host. Alternatively, when the interface is broadcast in nature, such as with a direct connection to a Local Area Network (LAN), the next-hop decision for the host is more complex. In this case a contiguous set of addresses is typically associated with nodes directly connected via the interface (a "subnet"). Thus, if an outgoing datagram is destined for a node on the directly connected subnet (e.g., the destination address is within the interface address space), the datagram is sent directly to the corresponding node, otherwise the datagram must be sent to a router on the directly connected subnet for forwarding. In general there may be more than one router on the subnet and a host may use different routers as the next-hop depending on the destination address of the datagram. However, in many cases a host will simply designate one router as a default next-hop and direct all outgoing datagrams (that are not destined for a node on the directly connected subnet) to that default router. Finally, a host may be multihomed, wherein it has more than one interface that provide connectivity to the internetwork. Each interface may have an associated set of addresses that corresponds to directly connected nodes. Outgoing datagrams destined to a directly connected node are sent to the node on the associated interface. Other outgoing datagrams may be directed either to a specific next-hop router based on the destination address of the datagram or to a default router. The next-hop decision for a router is much the same as that described for a multihomed host. The primary difference being that a router must make such a decision for both datagrams sourced by the router and datagrams being forwarded by the router.

IP Internetworking over Wireless Communication and Networking Technologies

Connectivity between nodes in an IP internetwork can be provided by both wired and wireless communications and network technologies. Wireless communication and network technology can be used to provide connectivity either directly between IP nodes that have wireless communication device interfaces or through non-IP wireless link-layer devices, such as a wireless access point serving as a bridge between a wireless LAN and a hardwired LAN. In any case, channel conditions, spatial relationships, and other factors have a significant impact on physical and link layer connectivity, which makes these link connections more dynamic and time varying than in hardwired networks.

Before packets, e.g., IP datagrams, can be transmitted between two wireless communication devices, a viable communication connection must be established. The process of establishing a wireless communication connection may progress through a series of possible stages as follows.
1. In the first stage, which may be referred to as "physical layer synchronization", devices typically detect one another based on physical layer mechanisms and synchronize with one another to allow further communication.
2. In the second stage, which may be referred to as "physical layer access exchange", the devices typically exchange a series of physical layer signals or control messages to enable access to air-link resources. After this stage, the devices can send and receive link layer control messages.
3. In the third stage, which may be referred to as "link layer exchange", the devices typically exchange a series of link layer control messages. This may include tasks such as authentication, authorization, registration and establishment of keys for enciphering and deciphering link traffic. After this stage, the devices can send and receive link layer data messages. Thus, the connection is capable of supporting the exchange of network and higher layer control and data packets (e.g., IP datagrams).
4. In the fourth stage, which may be referred to as "network layer exchange", the devices typically exchange network and higher layer control messages. This may include tasks such as address resolution, network layer admission control, internetwork routing, and negotiating quality of service. Depending on the specifics of the network/internetwork scenario, various control traffic exchanges in this fourth stage may be required before exchange of general IP data traffic is supported (particularly data traffic that must traverse more than one network hop).

Note that some of the message exchanges may directly or indirectly involve entities such as Authentication, Authorization and Accounting (AAA) servers other than the wireless communication devices and the entities that encompass them (particularly in the third and fourth stages above).

In some instances a communication connection may be more specifically described as either a physical-layer connection or a link-layer connection. While the specific attributes and differences may vary depending on the particular communication technology and/or protocols, the former loosely corresponds with the end of the second stage and the later with the end of the third stage. Since a link-layer connection is typically associated with link-layer functions such as message framing and ARQ, which need not be closely coupled to a particular physical layer connection, it is possible that in some communication systems a link-layer connection may include, or operate over, multiple physical layer connections. When higher layer packets are transmitted over a physical-layer or link-layer connection, they are typically partitioned into one or more frames, where each frame may include some additional header information. Depending on the underlying technology and/or protocols, frames may be either fixed or variable in length.

SUMMARY OF THE INVENTION

Figure 1:
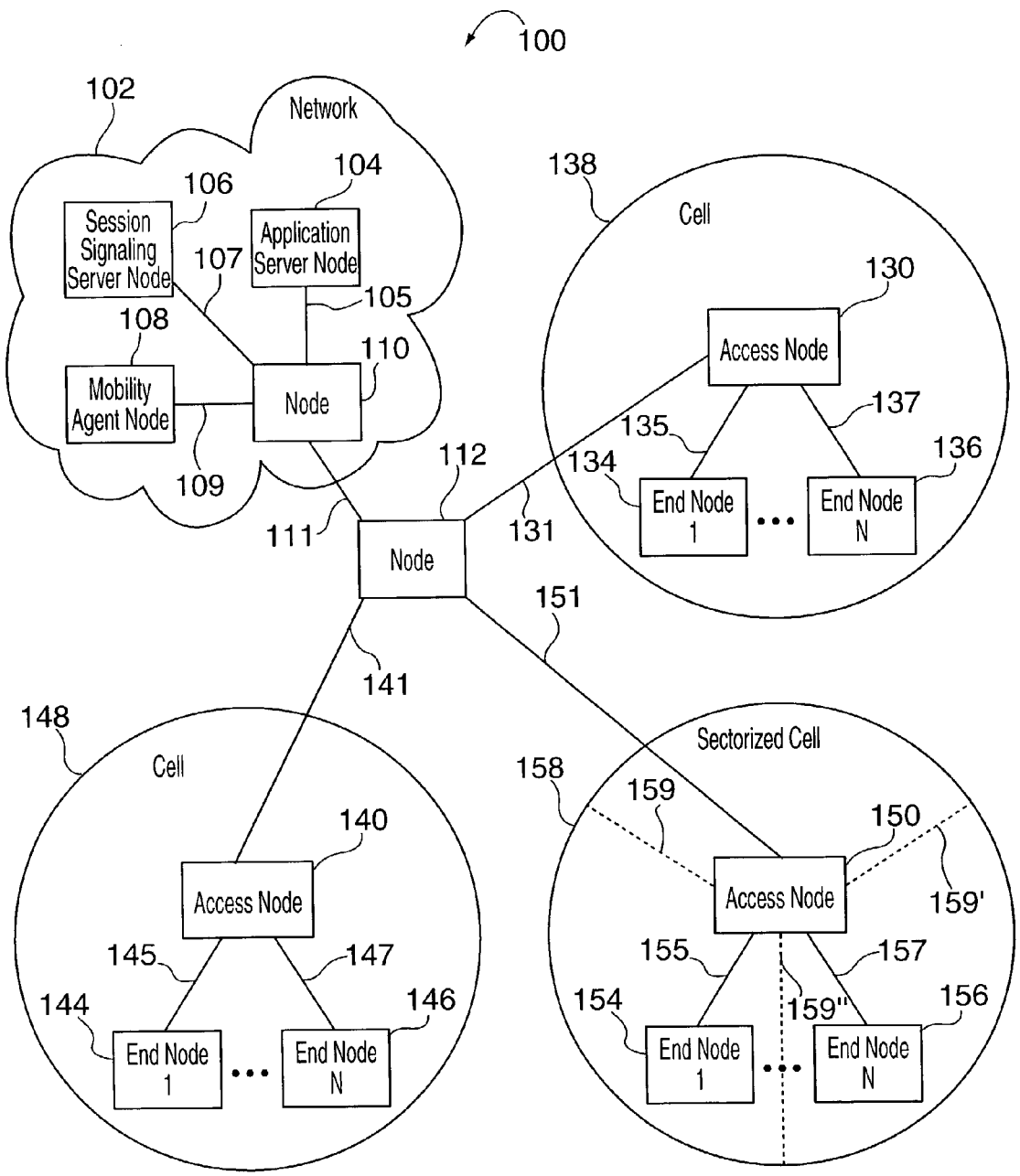
FIG. 1 illustrates a network diagram of an exemplary communications system in which the invention is applicable.

With some wireless technologies, it is possible to simultaneously maintain connectivity with multiple wireless communication devices to obtain a variety of performance benefits. Given a wireless technology that supports multiple simultaneous communication connections, the wireless communication device may or may not be limited to only transmitting or receiving on one such connection at a time. In the context of a cellular network, such a technology enables a wireless communication device or mobile terminal to maintain simultaneous communication connections with one or more base stations. In the context of IP internetworking, a wireless IP node could maintain simultaneous link-layer connections with multiple wireless access points or wireless access routers. This is possible even if the IP node has only a single wireless communication device or network interface card (NIC), and therefore would traditionally only have a single IP interface. It is also possible to develop a single NIC that supports simultaneous link-layer connections using multiple wireless communication and networking technologies, e.g., IEEE 802.11b and Orthogonal Frequency Division Multiplexing (OFDM).

The invention described herein enables a form of uplink macro-diversity in packet-switched cellular networks. It allows packets and/or portions of packets, e.g., frames, to be selectively sent from an end node, e.g., wireless communication device or mobile terminal, over a set of multiple communication connections, e.g., physical-layer or link-layer connections, to one or more access nodes, e.g., base stations. The new approach to uplink macro-diversity is achieved in part through innovative mechanisms for intelligent selective forwarding over multiple communication connections, where the forwarding decision is controlled by the end node based on a variety of factors, e.g., physical-layer channel conditions and/or higher layer policy. The forwarding decision is executed on a rapid timescale, e.g., on a per packet basis, to adapt to the dynamically varying conditions of the set of communication connections.

Advantageously, the inventive approach is consistent with a connectionless networking paradigm. Furthermore, the invention is particularly well suited for use in a cellular network architecture, since an end node can typically communicate with other nodes, e.g., other end nodes and/or application server nodes, in the network/internetwork through any one of a set of available access links and/or access nodes. The invention achieves uplink macro-diversity by enabling the end node to select the preferred uplink on a per packet basis subject to prevailing channel conditions, availability of air-link resources and other constraints. This is particularly important when the communication connections are subject to independent or partially correlated time variations in signal strength and interference. Finally, the invention improves the robustness and efficiency of communication, overall utilization of air-link resources, and quality of service experienced by the end node.

Viewed from a first aspect, the invention is directed to a method for providing uplink macro-diversity in a communications network. More specifically, the inventive method maintains a plurality of communications connections between an end node and at least two different receivers; monitors channel conditions on the communications connections; selects, as a function of the monitored channel conditions, between the plurality of communications connections for purposes of transmitting at least a portion of a packet; transmitting at least a portion of a packet using the selected communications channel; and repeating the above-steps.

Advantageously, the method may be used in a variety of configurations, e.g., wireless networks, monitoring characteristics from physical layer connections, link layer connections, or higher layer connections. In addition, multiple communications protocols may be supported simultaneously using the same or different access nodes, as well as controlling packet size as a function of channel conditions and switching the uplink multiple times without switching the downlink.

Viewed from another aspect, the invention is directed to an apparatus for providing uplink macro-diversity in a communications network. In particular, a communications system including an end node and at least two different receivers to which the end node communicates, the end node having a means for maintaining a plurality of communications connections between the end node and the receivers; a means for monitoring channel conditions on the communications connections; a means for selecting between the communications connections and a means for transmitting at least a portion of a packet using selected connections.

Further aspects of the apparatus include support for wireless connections; means for varying the packet size as a function of monitored channel conditions; and a means for selecting multiple times a communications connection while simultaneously maintaining a single downlink connection as well as a means for determining packet content, packet type and/or protocol to which the packet corresponds.

DETAILED DESCRIPTION OF THE FIGURES AND THE INVENTION

FIG. 1 illustrates an exemplary communication system 100, e.g., a cellular communication network, in which the invention is applicable. The exemplary communication system 100 comprises a plurality of nodes interconnected by communications links. Nodes in the exemplary communication system 100 may exchange information using signals, e.g., messages, based on communication protocols, e.g., IP. The communications links of the system 100 may be implemented, for example, using wires, e.g., fiber optic cables, and/or wireless communications techniques. The exemplary communication system 100 includes a plurality of end nodes 134, 136, 144, 146, 154, 156, which access the communication system via a plurality of access nodes 130, 140, 150. The end nodes 134, 136, 144, 146, 154, 156 may be, e.g., wireless communication devices or mobile terminals, and the access nodes 130, 140, 150 may be, e.g., wireless access routers or base stations. The exemplary communication system 100 also includes a number of other nodes as may be needed to provide interconnectivity or to provide specific services or functions. Specifically, the exemplary communication system 100 includes a mobility agent node 108, e.g., Mobile IP home agent node, as may be needed to support mobility of end nodes between access nodes, a session signaling server node 106, e.g., SIP proxy server, as may be needed to support establishment and maintenance of communication sessions between end nodes, and an application server node 104, e.g., multimedia server, as may be needed to support specific application layer services.

The exemplary system 100 shown in FIG. 1 depicts a network 102 that includes the application server node 104, the session signaling server node 106, and the mobility agent node 108, each of which is connected to an intermediate network node 110 by a corresponding network link 105, 107, 109, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 130, 140, 150 via network links 131, 141, 151, respectively.

Each access node 130, 140, 150 is depicted as providing connectivity to a plurality of N end nodes (134, 136), (144, 146), (154, 156), respectively, via corresponding access links (135, 137), (145, 147), (155, 157), respectively. In the exemplary communication system 100, each access node 130, 140, 150 is depicted as using wireless technology, e.g., wireless access links, to provide access. A radio coverage area, e.g., communications cell, 138, 148, 158 of each access node 130, 140, 150, respectively, is illustrated as a circle surrounding the corresponding access node. The radio coverage area 158 associated with one of the access nodes 150 is depicted as being subdivided into three subsections or sectors as illustrated by the dotted lines 159, 159', 159", e.g., as may be the case with a cellular base station deployed in a three sector configuration.

The exemplary communication system 100 is subsequently used as a basis for the description of various embodiments of the invention. Alternative embodiments of the invention include various network topologies, where the number and type of network nodes, the number and type of links, and the interconnectivity between nodes may differ from that of the exemplary communication system 100 depicted in FIG. 1.

Figure 2:
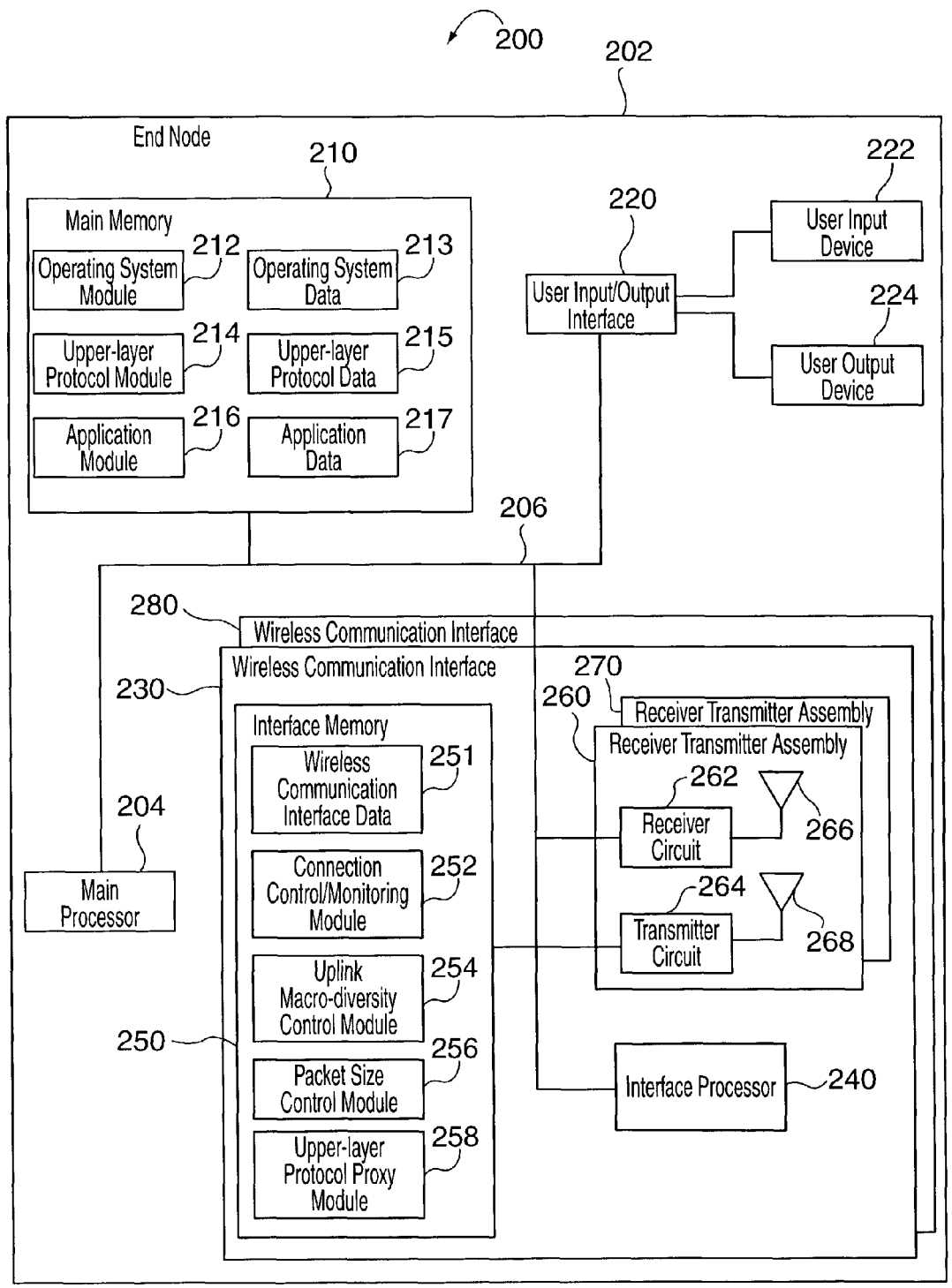
FIG. 2 illustrates an exemplary end node implemented in accordance with the present invention.

FIG. 2 provides a detailed illustration of an exemplary end node 200 implemented in accordance with the present invention. With reference now to that FIG. 2, the exemplary end node 200, is a detailed representation of an apparatus that may be used as any one of the end nodes 134, 136, 144, 146, 154, 156, depicted in FIG. 1. In the FIG. 2 embodiment, the end node 200 includes a main processor 204, a user input/output interface 220, one or more wireless communication interfaces 230, 280 and main memory 210 coupled together by bus 206. Accordingly, via bus 206 the various components of the end node 200 can exchange information, signals and data. The components 204, 220, 230, 280, 210, 206 of the end node 200 are located inside a housing 202.

The exemplary end node 200 includes a user input device 222, e.g., keypad, and a user output device 224, e.g., display, which are coupled to bus 206 via the user input/output interface 220. Thus, user input/output devices 222, 224 can exchange information, signals and data with other components of the end node 200 via user input/output interface 220 and bus 206. The user input/output interface 220 and associated devices 222, 224 provide a mechanism by which a user can operate the end node 200 to accomplish certain tasks. In particular, the user input device 222 and user output device 224 provide the functionality that allows a user to control the end node 200 and applications, e.g., modules, programs, routines and/or functions, that execute in the main memory 210 of the end node 200.

The main processor 204 under control of various modules, e.g., routines, included in the main memory 210 controls operation of the end node 200 to perform various signaling and processing tasks as discussed below. The modules included in the main memory 210 are executed on startup or as called by other modules. Modules may exchange data, information, and signals when executed. Modules may also share data and information when executed.

Each included wireless communication interface 230, 280 provides a mechanism by which the internal components of the end node 200 can send and receive signals to/from external devices and network nodes, e.g., access nodes. FIG. 2 includes a detailed illustration of a first exemplary wireless communication interface 230, which includes an interface processor 240, interface memory 250 and one or more receiver transmitter assemblies 260, 270. The interface processor 240 under control of various modules, e.g., routines, included in the interface memory 250 controls operation of the wireless communication interface 230 to perform various signaling and processing tasks as discussed below. The modules included in the interface memory 250 are executed on startup or as called by other modules. Modules may exchange data, information, and signals when executed. Modules may also share data and information when executed. The interface processor 240 and modules included in the interface memory 250 can exchange information, signals and data with the main processor 204 and modules included in the main memory 210 as well as other components of the end node 200 via bus 206. Addition wireless communication interfaces, e.g., 280, included in an end node need not support identical communication technologies or protocols and thus may not include identical components, subcomponents, modules, firmware or software.

FIG. 2 also includes a detailed illustration of a first exemplary receiver transmitter assembly 260 included in the first exemplary wireless communication interface 230. The first exemplary receiver transmitter assembly 260 includes a receive circuit 262 with a corresponding receive antenna 266 and a transmitter circuit 264 with a corresponding transmitter antenna 268 used for coupling the end node 200 to other network nodes, e.g., via wireless communication channels. Addition receiver transmitter assemblies, e.g., 270, included in a wireless communication interface need not support identical communication technologies or protocols and thus may not include identical components, subcomponents, modules, hardware, firmware or software.

A characteristic of an end node implemented in accordance with the present invention is the ability to establish and maintain multiple simultaneous communication connections with one or more other nodes, e.g., access nodes, where each connection can be used to send and receive control and data signals, e.g., messages. In some embodiments this capability is provided by a single wireless communication interface that includes a single receiver transmitter assembly, while other embodiments may employ one or more wireless communication interfaces each with one or more receiver transmitter assemblies. In some embodiments of the invention, a wireless communication interface includes multiple baseband transceivers.

In the FIG. 2 embodiment of the present invention, the main memory 210 of end node 200 includes an operating system module 212 with corresponding operating system data 213 as may be needed to control operation of the end node 200, an upper-layer protocol module 214 with corresponding upper-layer protocol data 215 as may be needed to support mobility or some other feature of the end node 200, and an application module 216 with corresponding application data 217 as may be needed to perform some task. These modules and data are intended to be representative of typical end node computing systems and have been included to facilitate subsequent description of the invention and its operation.

The interface memory 250 of the first wireless communication interface 230 includes modules and data as may be used to implement various aspects of the invention. In particular, the interface memory 250 of the FIG. 2 embodiment includes a connection control/monitoring module 252, an uplink macro-diversity control module 254, a packet size control module 256, an upper-layer protocol proxy module 258, and wireless communication interface data 251.

The connection control/monitoring module 252 controls the operation of the wireless communication interface 230 and/or end node 200 associated with establishing and maintaining communication connections, e.g., access links. In particular, the connection control/monitoring module 252 controls processing and signaling associated with detecting available access nodes, e.g., base stations and determining whether to establish, maintain, or tear down communication connections, e.g., access links. In some embodiments the connection control/monitoring module 252 uses a configurable set of parameters such as, but not limited to, pilot power, pilot power averaging time duration, minimum end node transmit power required and/or impact on inter-sector and/or inter-cell interference to monitor, assess and compare available access nodes and communication connections. The connection control/monitoring module 252 generally maintains one or more communication connections, e.g., access links, with one or more access nodes, as needed to provide reliable access to the network with sufficient resilience to dynamic channel conditions. Over time, the connection control/monitoring module 252 establishes, maintains or tears down communication connections in order to maintain a suitable set of alternative uplinks. In general, both the end node 200 and access nodes may limit the number and/or frequency of transitions. The number of simultaneous communication connections may also be subject to hardware, software and other implementation limitations of the wireless communication interface 230 and/or end node 200. In some embodiment of the invention, the connection control/monitoring module 252 accesses the wireless communication interface data 251 to store, retrieve and/or modify configuration information, e.g., parameters, and operation information, e.g, current status of various communication connections.

For the purpose of describing this invention, a bi-directional communication connection can be viewed as comprising two unidirectional communication connections, where the ability to send traffic, e.g., frames or packets, in either direction may vary as a function of time. When a distinction is required or useful for explaining the invention we will refer to the connection directed from the end node to the access node as the "uplink" and the connection directed from the access node to the end node as the "downlink".

The uplink macro-diversity control module 254 controls the operation of the wireless communication interface 230 and/or end node 200, associated with selective forwarding of signals, e.g., messages, from the end node 200, when the end node 200 has multiple simultaneous uplink communication connections, e.g., access links to one or more access nodes. In particular, the uplink macro-diversity control module 254 controls processing associated with selecting the particular uplink communication connection over which to send a packet and/or portion of a packet, e.g., frame, from among the set of available communication connections maintained and monitored by the connection control/monitoring module 252. The selection process or determination of the particular uplink communication connection on which to send is based on one or more factors, e.g., physical-layer channel conditions, link-layer characteristics, contents and/or size of the packet and/or portion of the packet, corresponding protocol with which the packet is associated, type of packet, corresponding access node, and/or higher layer policy. In some embodiments of the invention, the uplink macro-diversity control module 254 accesses the wireless communication interface data 251 to store, retrieve and/or modify configuration information, e.g., parameters, and operation information, e.g, current status of various communication connections.

The packet size control module 256 controls the operation of the wireless communication interface 230 and/or end node 200, associated with adapting the size of packets transmitted over the available communication connections. In particular, the packet size control module 256 controls processing and signaling associated with adapting the size of packets based on dynamic physical-layer and/or link-layer conditions, e.g., as monitored and/or reported by the connection control/monitoring module 252. The determination of the packet size for transmission is based on one or more factors, e.g., physical-layer channel conditions, link-layer characteristics, contents of the packet, corresponding protocol with which the packet is associated, type of packet, and/or higher layer policy. In some embodiments of the present invention, the packet size control module 256 utilizes packet fragmentation mechanisms, e.g., IP fragmentation, to dynamically control and adjust packet size prior to transmission. In alternative embodiments the packet size control module 256 may dynamically signal the preferred packet size to the sending application (e.g., application module 216), or operating system (e.g., operating system module 212), such that the sending application or operating system may adjust packet sizes as needed and avoid fragmentation. In some embodiments of the invention, the packet size control module 256 accesses the wireless communication interface data 251 to store, retrieve and/or modify configuration information, e.g., parameters, and operation information, e.g, current status of various communication connections.

The upper-layer protocol proxy module 258 controls the operation of the wireless communication interface 230 and/or end node 200, associated with enabling uplink macro-diversity selective forwarding to be based in part on the contents and/or size of the packet, corresponding protocol with which the packet is associated, type of packet, corresponding access node, and/or higher layer policy. In particular, the upper-layer protocol proxy module 258 controls processing and signaling associated with determining higher layer conditions and/or policy that affect the selective forwarding decision. For example, a particular upper layer protocol, e.g., signaled from the upper-layer protocol module 214 included in the main memory 210, may require that its messages be directed over a particular communication connection or to a particular access node and thus are not eligible for dynamic selective forwarding by the uplink macro-diversity control module 254. In some embodiments, the upper layer protocol module 214 may directly signal its requirements, e.g., via an application programming interface (API), to the uplink macro-diversity control module 254. Alternatively, the upper layer protocol module 214 may directly signal its requirements to the upper-layer protocol proxy module 258 included in the wireless communication interface 230 via existing protocol mechanisms, signals, and/or messages. This approach has the benefit of minimizing changes to pre-existing protocol modules included in main memory 210 when implementing the invention. In another alternative embodiment, the upper-layer protocol proxy module 258 may transparently intercept signals, e.g., messages, sent by the upper layer protocol module 214 to determine the required information. This has the benefit of requiring no changes to pre-existing protocol modules included in main memory 210 when implementing the invention. In some embodiments of the invention, the upper-layer protocol proxy module 258 accesses the wireless communication interface data 251 to store, retrieve and/or modify configuration information, e.g., parameters, and operation information, e.g, current status of various communication connections.

In some embodiments of the present invention, some or all of the modules 252, 254, 256, 258 and data 251 are additionally or alternatively included in the main memory 210. It may be particularly useful to include a module, e.g., the uplink macro-diversity control module 254, in the main memory 210 when the end node 200 contains more than one wireless communication interface and the functionality provided by the particular module should operate over communication connections supported via different wireless communication interfaces. Also, in embodiments where a wireless communication interface does not include an interface processor and/or interface memory, some or all of the modules 252, 254, 256, 258 and data 251 may alternatively be included in the main memory 210.

Figure 3:
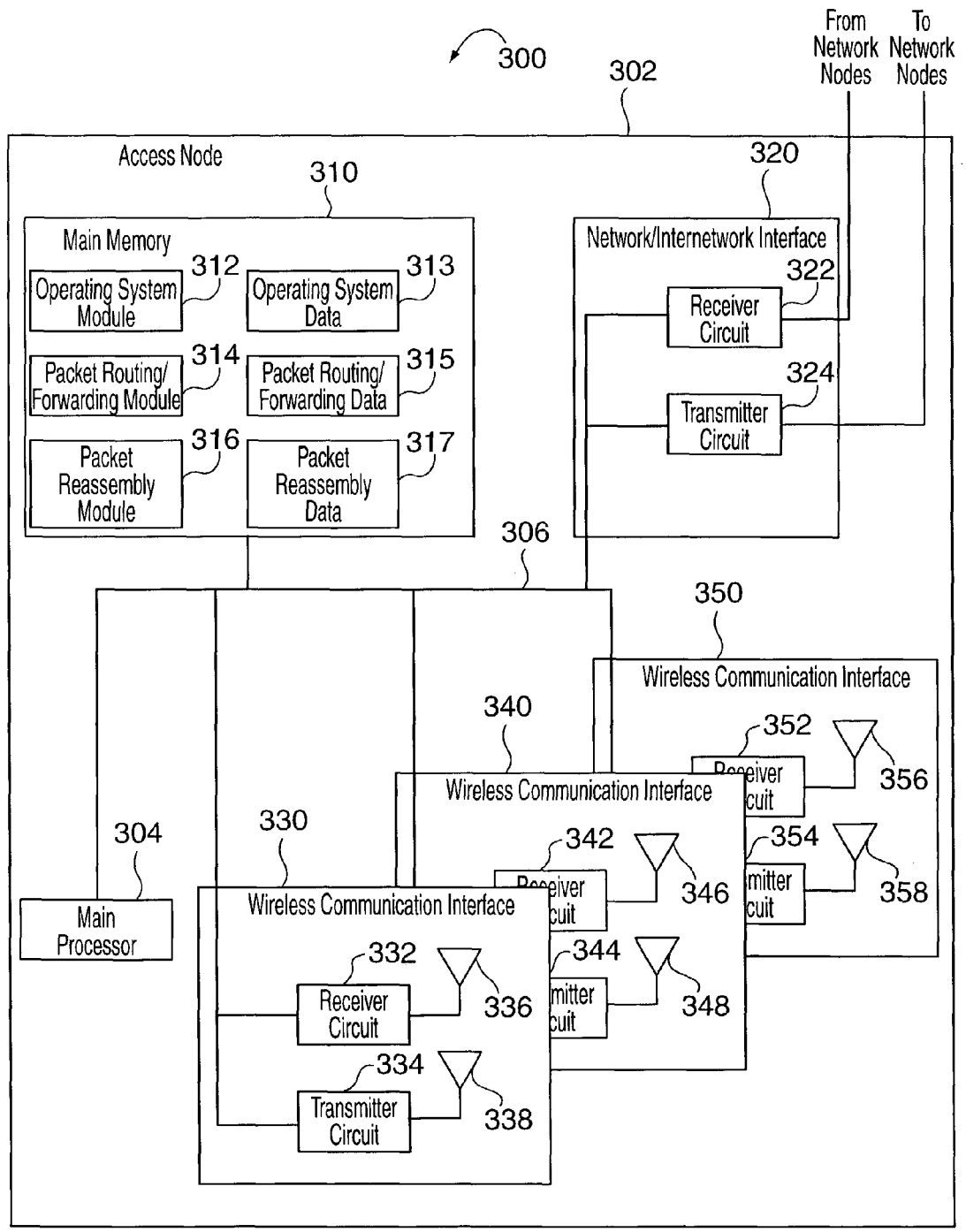
FIG. 3 illustrates an exemplary access node implemented in accordance with the present invention.

FIG. 3 provides a detailed illustration of an exemplary access node 300 implemented in accordance with the present invention. The exemplary access node 300, depicted in FIG. 3, is a detailed representation of an apparatus that may be used as any one of the access nodes 130, 140, 150, depicted in FIG. 1. In the FIG. 3 embodiment, the access node 300 includes a main processor 304, a network/internetwork interface 320, one or more wireless communication interfaces 330, 340, 350 and main memory 310, coupled together by a bus 306. Accordingly, via bus 306 the various components of the access node 300 can exchange information, signals and data. The components 304, 320, 330, 340, 350, 306 of the access node 300 are located inside a housing 302.

The network/internetwork interface 320 provides a mechanism by which the internal components of the access node 300 can send and receive signals to/from external devices and network nodes. The network/internetwork interface 320 includes, a receiver circuit 322 and a transmitter circuit 324 used for coupling the node 300 to other network nodes, e.g., via copper wires, fiber optic lines or wireless links.

Each included wireless communication interface 330, 340, 350 provides a mechanism by which the internal components of the access node 300 can send and receive signals to/from external devices and network nodes, e.g., end nodes. Each wireless communication interface 330, 340, 350 includes, e.g., a receiver circuit 332, 342, 352, respectively, with a corresponding receiving antenna 336, 346, 356, respectively, and a transmitter circuit 334, 344, 354, respectively, with a corresponding transmitting antenna 338, 348, 358, respectively, used for coupling the access node 300 to other network nodes, e.g., via wireless communication channels.

The main processor 304 under the control of various modules, e.g., routines, included in the main memory 310, controls operation of the access node 300 to perform various signaling and processing tasks, as discussed below. The modules included in main memory 310 are executed on startup or as called by other modules. Modules may exchange data, information, and signals when executed. Modules may also share data and information when executed.

In the FIG. 3 embodiment, the main memory 310 of the access node 300 includes an operating system module 312 with corresponding operating system data 313 as may be needed to control operation of the access node 300, an packet routing and forwarding module 314 with corresponding packet routing and forwarding data 315 as may be needed to control the forwarding of packets through the access node 300, and a packet reassembly module 316 with corresponding packet reassembly data 317 as may be needed to reassemble portions of packets, e.g., frames, received over various communication connections, via one or more wireless communication interfaces 330, 340, 350.

Figure 4:
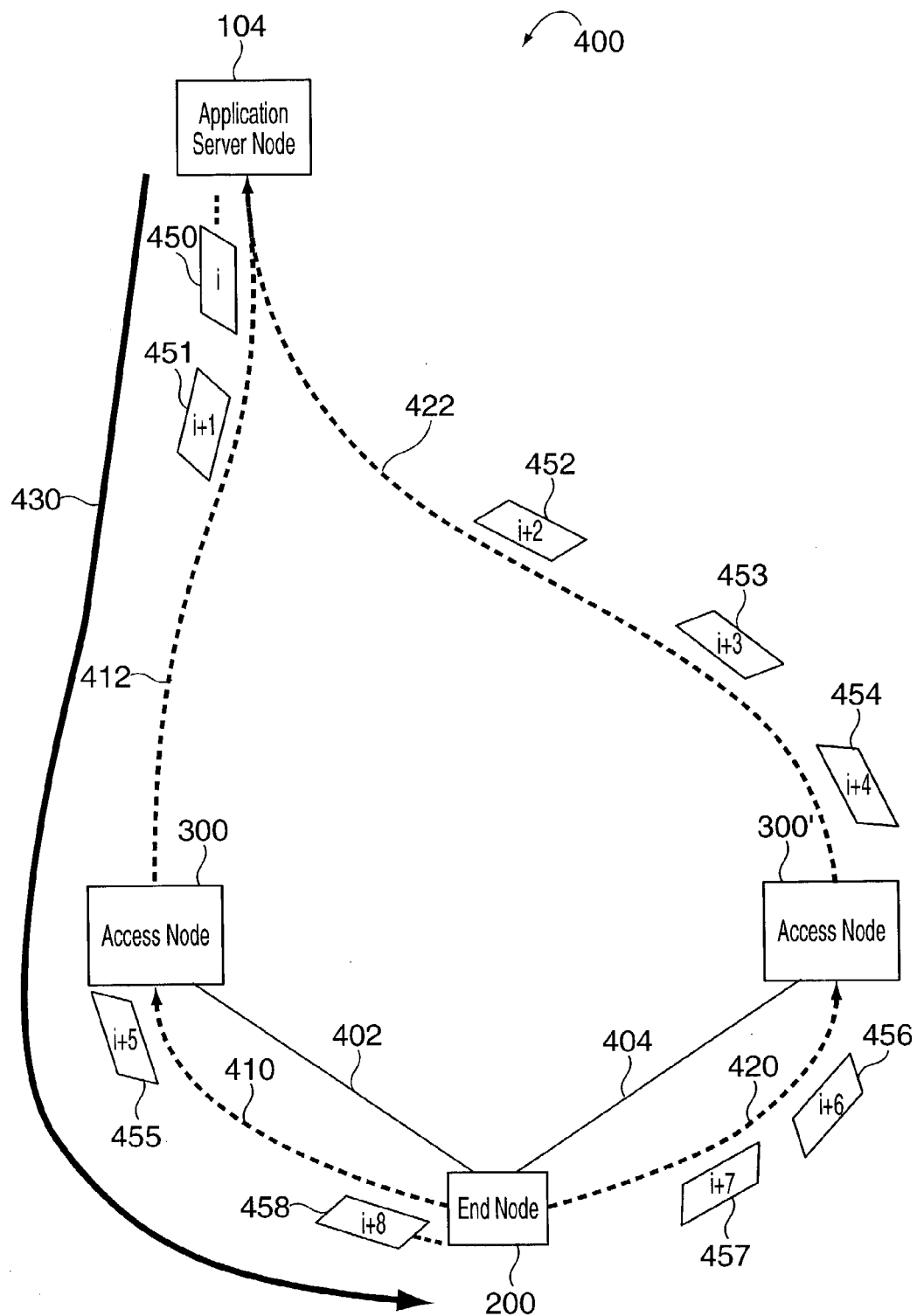
FIG. 4 illustrates operations associated with sending a flow of packets from an end node to another network node, when performing uplink macro-diversity, in accordance with an exemplary embodiment of the invention, on a packet basis over multiple connections with different access nodes.
Figure 5:
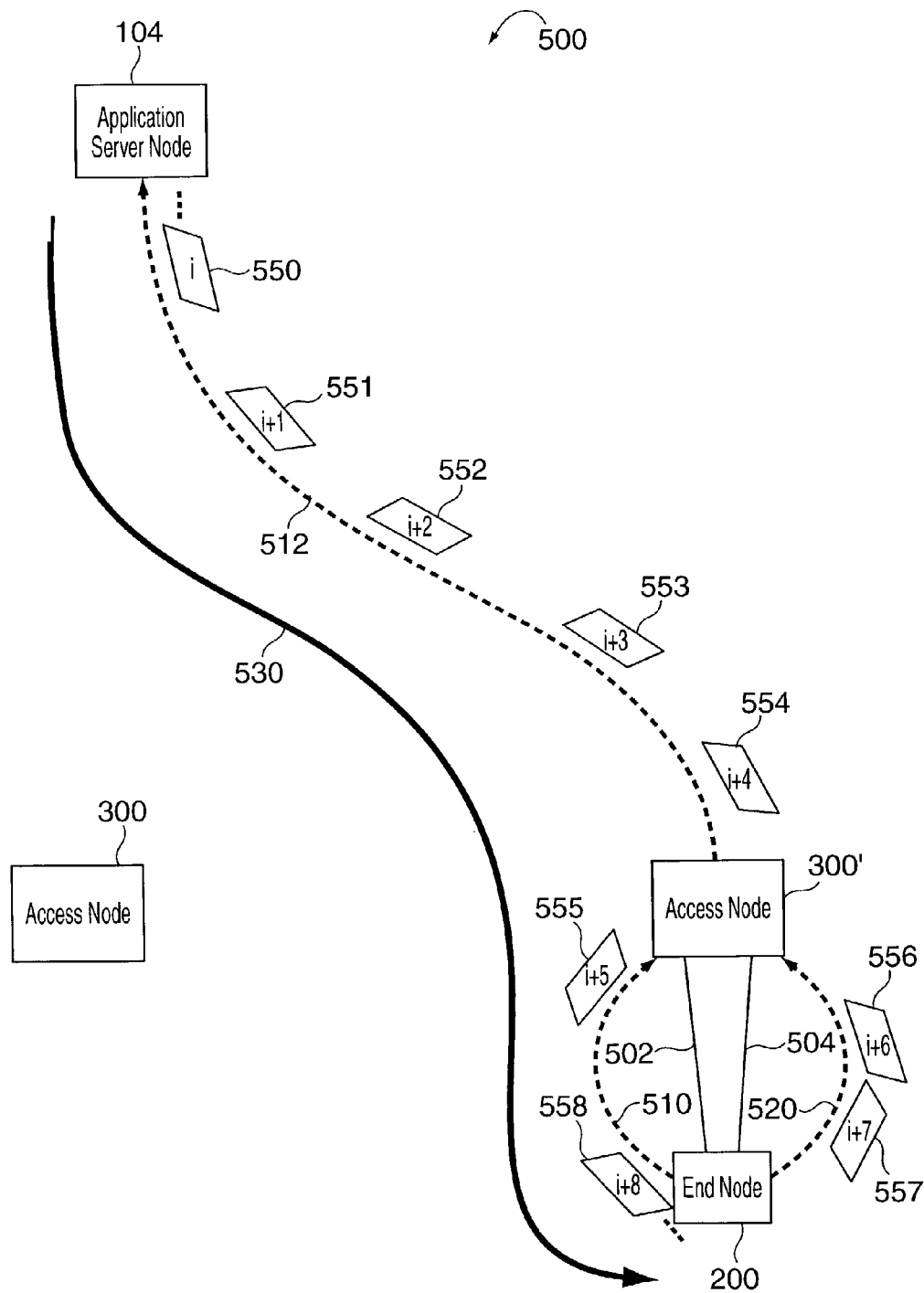
FIG. 5 illustrates operations associated with sending a flow of packets from an end node to another network node, when performing uplink macro-diversity, in accordance with an exemplary embodiment of the invention, on a packet basis over multiple connections with the same access node.
Figure 6:
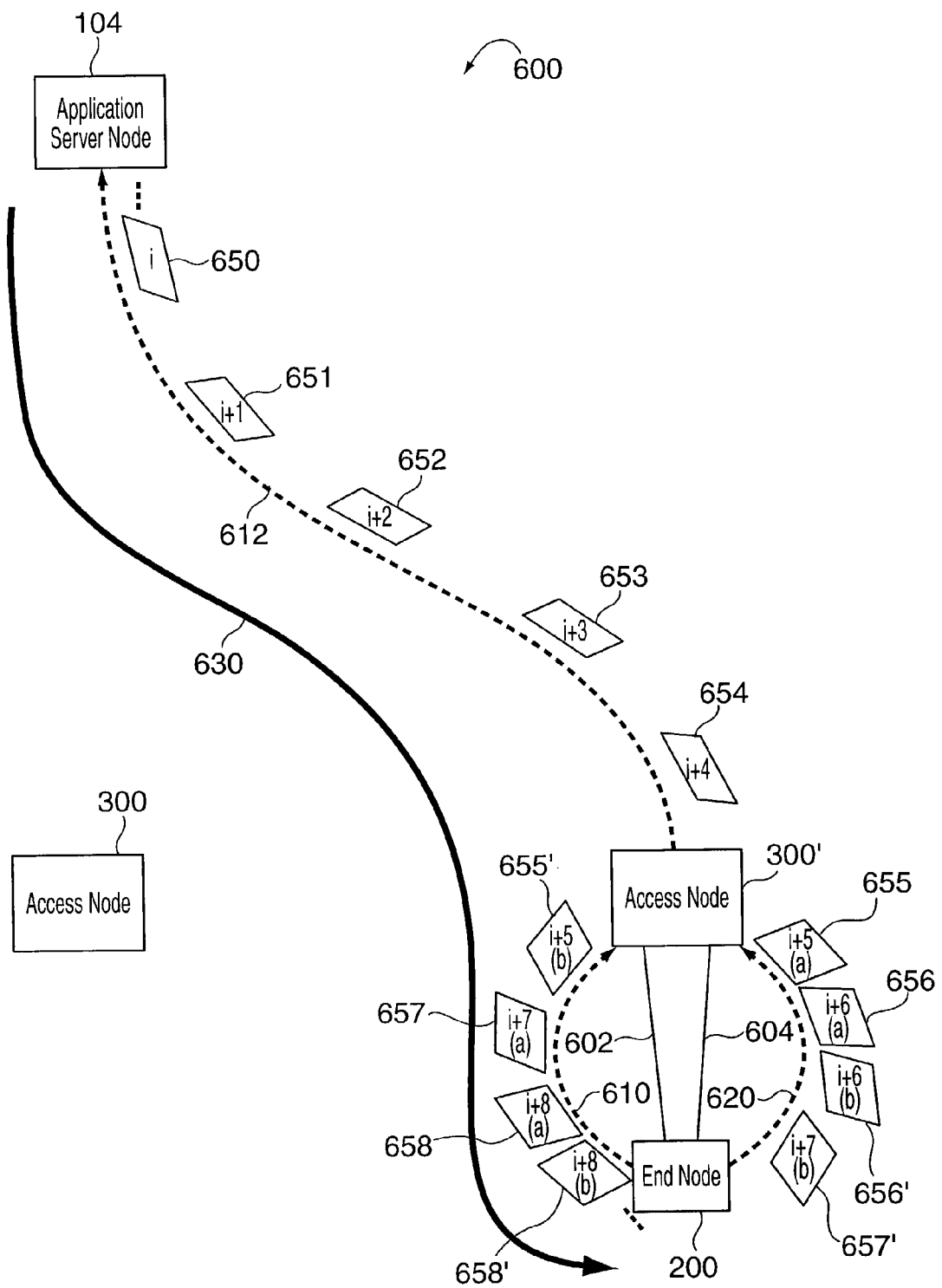
FIG. 6 illustrates operations associated with sending a flow of packets from an end node to another network node, when performing uplink macro-diversity, in accordance with an exemplary embodiment of the invention, on a frame basis over multiple connections with the same access node.

FIGS. 4, 5 and 6 illustrate the operation of uplink macro-diversity performed in accordance the present invention in the context of the exemplary communication system 100. As compared with FIG. 1, the illustrations in FIGS. 4-6 are more logical in nature rather than physical, so only a relevant subset of the nodes in the exemplary communication system 100 are depicted, thus, many of the physical nodes and links have been omitted. Where signaling, or delivery of packets, is shown between two entities, it is assumed that such signals, or packets, are transported as needed via intermediate nodes and/or links physically interconnecting the two entities. The illustrations in FIGS. 4-6 include the application server node 104, two access nodes 300, 300' implemented in accordance with the invention, and a single end node 200 implemented in accordance with the invention. The end node 200 and access nodes 300, 300' shown in FIGS. 4-6 are simplified representations of those depicted in FIGS. 2 and 3, respectively.

FIGS. 4-6 illustrate various aspects of uplink macro-diversity in various scenarios. FIG. 4 illustrates the operation of uplink macro-diversity where selective forwarding is performed on packets over two simultaneously maintained communication connections, e.g., access links, with two access nodes. FIG. 5 illustrates the operation of uplink macro-diversity where selective forwarding is performed on packets over two simultaneously maintained communication connections, e.g., access links, with the same access node. FIG. 6 illustrates the operation of uplink macro-diversity where selective forwarding is performed on portions of packets, e.g., frames, over two simultaneously maintained communication connections, e.g., access links, with the same access node. The set of exemplary scenarios illustrated in FIGS. 4-6 are intended to assist in describing the invention. There are an unlimited number of other scenarios and network/internetwork topologies for which the invention is applicable, some of which can be envisioned by combining the depicted scenarios. Note that while FIGS. 4-6 each depict a scenario with two communication connections, the invention is more widely applicable to scenarios where there are two or more communication connections with one or more access nodes.

Prior to detailing the unique aspects of operation for FIGS. 4-6, the following first describes features and operation that are applicable to all three figures. In accordance with the present invention the connection control/monitoring module 252 included in the end node 200 monitors signals from various access nodes and uses this information, possibly in combination with information stored in the wireless communication interface data 251, to determine if it should establish, maintain, or tear down communication connections. In each of FIGS. 4, 5 and 6, the end node 200 is depicted with two communication connections (402, 404), (502, 504), (602, 604), respectively. It is assumed that the end node 200 and access nodes 300, 300' have already performed the necessary operations to progress the communication connections (402, 404), (502, 504), (602, 604) through the necessary stages as previously discussed to enable the exchange of link-layer data messages (and thus higher layer packets). This may be done using known techniques. The details regarding how this is accomplished are specific to the particular wireless technology and/or communication protocols and will not be described herein since known methods may be used. However, in order for the end node 200 to establish multiple simultaneous communication connections, it should be able to independently exchange link-layer control messages with multiple entities and direct control messages to a specific entity as needed.

It is also assumed that each of the communication connections (402, 404), (502, 504), (602, 604) is capable of supporting bi-directional exchange of link-layer data messages (e.g., frames) and higher layer packet (e.g., IP datagrams), although not necessarily at every instant in time. Channel conditions, spatial relationships, and other time varying dynamic factors may impede the ability to exchange link-layer messages (and thus higher layer packets) in one or both directions at any instant in time. Typically the physical, MAC, and link layers provide some ability to adapt to and persist through some degree of such dynamics without tearing down and re-establishing the communication connection.

In the FIG. 4 illustration, the end node 200 has a plurality of simultaneous communication connections 402, 404—a first communication connection 402 with a first access node 300 and a second communication connection 404 with a second access node 300'. FIG. 4 also depicts a sequence of packets 450, 451, 452, 453, 454, 455, 456, 457, 458 with sequence numbers i to i+8, being part of a packet flow sent from the end node 200 to the application server node 104. The dashed lines with arrows 410, 412, 420, 422 depict two possible paths over which packets may be delivered from the end node 200 to the application server node 104. Packets sent from the end node 200 over the first communication connection 402 are delivered via the first access node 300 along a first path (denoted by arrows 410 and 412), while packets sent from the end node 200 over the second communication connection 404 are delivered via the second access node 300' along a second path (denoted by arrows 420 and 422).

In accordance with the present invention, the uplink macro-diversity control module 254 include in the end node 200 selects the particular communication connection 402, 404, e.g., uplink, over which to send each packet from among the set of communication connections maintained and monitored by the connection control/monitoring module 252. The selection process or determination of the particular communication connection on which to send is based on one or more factors, e.g., physical-layer channel conditions as monitored or reported by the connection control/monitoring module 252, and/or higher layer policy. Note that the preferred communication connection for transporting uplink and downlink may be independently selected and thus may differ at any point in time. In accordance with the present invention, the end node 200 can selectively forward uplink traffic over the set of communication connections on a rapid time scale to accommodate the physical-layer and/or link-layer dynamics. However, forwarding of downlink traffic destined for the end node 200 is typically directed based on routing information maintained by nodes in the network infrastructure, e.g., the access nodes 300, 300' and/or the mobility agent node 108. The latency of control loops and signaling associated with dynamically adapting or re-configuring the corresponding routing information for downlink traffic using traditional techniques may require considerable time for convergence and thus would typically exceed the time scale of physical-layer and link-layer dynamics. To highlight this point a solid line with an arrow 430 is used to depict a single exemplary path over which packets may be delivered from the application server node 104 to end node 200.

To illustrate the dynamic selective forwarding performed by the end node 200, individual packets from the sequence of packets 450, 451, 452, 453, 454, 455, 456, 457, 458 are depicted as following one of the two paths. Specifically, packets with sequence numbers i (450), i+1 (451), i+5 (455) and i+8 (458) are shown as following the first path, being sent over the first communication connection 402 and delivered via the first access node 300, while packets with sequence numbers i+2 (452), i+3 (453), i+4 (454), i+6 (556) and i+7 (457) are shown as following the second path, being sent over the second communication connection 404 and delivered via the second access node 300'.

In the FIG. 5 illustration, the end node 200 has a plurality of simultaneous communication connections 502, 504, where both the first communication connection 502 and the second communication connection 504 are with a single access node 300', herein referred to as the second access node 300'. FIG. 5 also depicts a sequence of packets 550, 551, 552, 553, 554, 555, 556, 557, 558 with sequence numbers i to i+8, being part of a packet flow sent from the end node 200 to the application server node 104. The dashed lines with arrows 510, 512, 520 depict the possible paths over which packets may be delivered from the end node 200 to the application server node 104. In this scenario, there are two paths by which packets may be delivered from the end node 200 to the second access node 300' and only a single path from the second access node 300' to the application server node 104. Packets sent from the end node 200 over the first communication connection 502 are delivered along a first path (denoted by arrow 510) to the second access node 300', while packets sent from the end node 200 over the second communication connection 504 are delivered along a second path (denoted by arrow 520) to the second access node 300'. Packets sent from the end node 200 over either communication connection 502, 504 follow also the same path (denoted by arrow 512) from the second access node 300' to the application server node 104.

In accordance with the present invention, the uplink macro-diversity control module 254 include in the end node 200 selects the particular communication connection 502, 504, e.g., uplink, over which to send each packet from among the set of communication connections maintained and monitored by the connection control/monitoring module 252. The selection process or determination of the particular communication connection on which to send is based on one or more factors, e.g., physical-layer channel conditions as monitored or reported by the connection control/monitoring module 252 and/or higher layer policy. As in FIG. 4, a solid line with an arrow 530 is used to depict a single exemplary path over which packets may be delivered from the application server node 104 to end node 200.

To illustrate the dynamic selective forwarding performed by the end node 200, individual packets from the sequence of packets 550, 551, 552, 553, 554, 555, 556, 557, 558 are depicted as following one of the two paths from the end node 200 to the second access node 300'. Specifically, packets with sequence numbers i+5 (555) and i+8 (558) are shown as following the first path, being sent over the first communication connection 502, while packets with sequence numbers i+6 (556) and i+7 (557) are shown as following the second path, being sent over the second communication connection 504. Packets with sequence numbers i (550), i+1 (551), i+2 (552), i+3 (553) and i+4 (554) are depicted following the path from the second access node 300' to the application server node 104.

In the FIG. 6 illustration, the end node 200 has a plurality of simultaneous communication connections 602, 604, where both the first communication connection 602 and the second communication connection 604 are with a single access node 300', herein referred to as the second access node 300'. FIG. 6 also depicts a sequence of packets 650, 651, 652, 653, 654, 655, 656, 657, 658 with sequence numbers i to i+8, being part of a packet flow sent from the end node 200 to the application server node 104. FIG. 6 further illustrates the subdivision of packets for transmission from the end node 200 to the second access node 300'. Thus, packets with sequence numbers i+5 (655), i+6 (656) i+7 (657) and i+8 (658) are each depicted as being divided into two portions, e.g., frames, where the first portion is labeled (a) and the second portion is labeled (b). Note that the reference number for the second portion of each subdivided packet is also indicated by a symbol. The choice of two subdivisions is arbitrary and in general a packet may be subdivided into any number of portions.

The dashed lines with arrows 610, 612, 620 depict the possible paths over which packets may be delivered from the end node 200 to the application server node 104. In this scenario, there are two paths by which packets may be delivered from the end node 200 to the second access node 300' and only a single path from the second access node 300' to the application server node 104. Packets sent from the end node 200 over the first communication connection 602 are delivered along a first path (denoted by arrow 610) to the second access node 300', while packets sent from the end node 200 over the second communication connection 604 are delivered along a second path (denoted by arrow 620) to the second access node 300'. Packets sent from the end node 200 over either communication connection 602, 604 follow also the same path (denoted by arrow 612) from the second access node 300' to the application server node 104.

In accordance with the present invention, the uplink macro-diversity control module 254 include in the end node 200 selects the particular communication connection 602, 604, e.g., uplink, over which to send each portion of a packet, e.g., frame, from among the set of communication connections maintained and monitored by the connection control/monitoring module 252. While in FIGS. 4 and 5 the selective forwarding is depicted as occurring on whole packets, e.g., packet boundaries, in FIG. 6 the selective forwarding is depicted as occurring on portions of packets, e.g., frame boundaries. The selection process or determination of the particular uplink communication connection on which to send is based on one or more factors, e.g., physical-layer channel conditions as monitored or reported by the connection control/monitoring module 252 and/or higher layer policy. As in FIGS. 4 and 5, a solid line with an arrow 630 is used to depict a single exemplary path over which packets may be delivered from the application server node 104 to end node 200.

To illustrate the dynamic selective forwarding performed by the end node 200, individual portions of packets from the sequence of packets 650, 651, 652, 653, 654, 655, 656, 657, 658 are depicted as following one of the two paths from the end node 200 to the second access node 300'. Specifically, packet portions with sequence numbers i+5(b) (655'), i+7(a) (657), i+8(a) (658) and i+8(b) (558') are shown as following the first path, being sent over the first communication connection 602, while packet portions with sequence numbers i+5(a) (655), i+6(a) (656), i+6(b) (656') and i+7(b) (557') are shown as following the second path, being sent over the second communication connection 604. Packets with sequence numbers i (650), i+1 (651), i+2 (652), i+3 (653) and i+4 (654) are depicted following the path from the second access node 300' to the application server node 104.

In accordance with the exemplary embodiment of the present invention, the packet reassembly module 316' included in the second access node 300' reassembles portions of packets received from the end node 200 over the various communication connections 602, 604 prior to subsequent forwarding by the packet routing/forwarding module 314'. In particular, the packet reassembly module 316' is capable of reassembling a packet from portions that have been received over different communication connections.

In some embodiments of the present invention, communications between nodes is based all, or in part, on IP internetworking. Thus, communication of both data and/or control signaling between the network nodes may use IP packets, e.g., datagrams. In embodiments of the present invention that utilize IP packets, said IP packets may be delivered to the intended destination nodes using either unicast or multicast addressing and delivery mechanisms. The use of IP multicast is particularly useful when the same information is sent from one node to a plurality of other nodes.

The methods and apparatus of the present invention may be used with CDMA, (OFDM), or various other types of communications techniques which may be used to provide wireless communications links between access nodes and end nodes. Accordingly, in some embodiments the access nodes are implemented as base stations which establish communications links with end nodes using OFDM or CDMA. In various embodiments the end nodes are implemented as notebook computers, personal data assistants (PDAs), or other portable devices including receiver/transmitter circuits and logic and/or routines, for implementing the methods of the present invention.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A method of operating a wireless terminal, comprising:
    maintaining a plurality of communications connections between said wireless terminal and at least two different receivers connected to a single network node, wherein the single network node is an Internet Protocol (IP) node, and wherein a communication connection exists between said wireless terminal and each receiver;
    monitoring channel conditions on the plurality of communications connections;
    dynamically determining a packet size to be used as a function of the monitored channel conditions;
    changing the length of at least one packet using IP fragmentation to generate portions of packets of a first application in response to a change in the monitored channel conditions, the portions of packets being transmitted over at least one of the plurality of communications connections;
    selecting a first communications connection for transmitting at least some of the portions of packets of the first application, as a function of said monitored channel conditions, from said plurality of communications;
    selecting a second communications connection for transmitting at least some of the portions of packets of the first application, as a function of said monitored channel conditions, from said plurality of communications connections;
    transmitting a first portion of the at least one packet of the first application using the first selected communications connection; and
    transmitting a second portion of the at least one packet of the first application using the second selected communications connection.

2. The method of claim 1, wherein said plurality of communications connections are wireless.

3. The method of claim 1, wherein said plurality of communications connections are physical layer connections.

4. The method of claim 1, wherein said plurality of communications connections are link layer connections.

5. The method of claim 1, wherein the first portion of the at least one packet transmitted over the first selected communications connection is transmitted using a first communications protocol and wherein the second portions of the at least one packet transmitted over the second selected communications connection is transmitted using a second communications protocol which is different from the first communications protocol.

6. The method of claim 5, wherein said first communications protocol is compatible with IEEE 802.11b (1995) and the second communications protocol is an OFDM based communications protocol.

7. The method of claim 1, wherein a frame corresponds to a portion of a packet, said selecting steps being performed to correspond to frame boundaries such that changes in a connection occur at the end of transmission of a frame with transmission of a new frame occurring on the selected connection.

8. The method of claim 1, wherein said receivers are located at different access nodes.

9. The method of claim 1, wherein said receivers are located at the same access node.

10. The method of claim 9, further comprising:
    operating said access node to combine the first and second portions of the at least one packet transmitted over different communications channels to reassemble said at least one packet; and
    operating said access node to transmit said reassembled at least one packet to another node.

11. The method of claim 10, wherein said access node is a base station.

12. The method of claim 1, further comprising the step of:
    controlling the transmission packet length by signaling a source of said packets to generate packets of a different size.

13. The method of claim 1, wherein said wireless terminal is a mobile node; and wherein said selecting steps are performed independent of mobile node handoff between access nodes.

14. The method of claim 1, wherein said selecting is performed multiple times resulting in a communications connection being used as an uplink by said wireless terminal being changed multiple times during a period of time in which a single downlink is maintained.

15. The method of claim 1 wherein said selecting is performed according to physical layer channel conditions.

16. The method of claim 1 wherein said selecting is performed according to link layer channel conditions.

17. The method of claim 1 wherein said selecting is performed according to layer characteristics other than physical layer characteristics or link layer characteristics.

18. The method of claim 1, wherein said selecting is further performed as a function of at least one of packet size and higher layer policy.

19. The method of claim 18, wherein said selecting includes selecting the same communications connection to transmit portions of packets corresponding to a specific communications protocol during a period of time; and
wherein said selecting includes selecting between different communications connections during portions of said period of time used for transmitting portions of packets which do not correspond to said specific communications protocol.

20. A method of operating a wireless terminal in a communications network, the method comprising:
monitoring the quality of a communications connection coupling said wireless terminal to at least one other communications network component;
dynamically determining a packet size to be used as a function of the determined quality of the communications connection; and
changing the length of packets using IP fragmentation to generate portions of packets transmitted over said communications connection, in response to a change in the dynamically determined packet size, the length of packets being reduced in response to a detected reduction in communications connection quality and being increased in response to detection of an improvement in the quality of the communications connection;
selecting, for purposes of transmitting portions of packets corresponding to a first application, between said plurality of communications connections as a function of the detected quality of the individual communications connections; and
switching back and forth between said communications connections for purposes of transmitting portions of packets corresponding to said first application as a function of said selecting operation, each transmitted portion of a packet corresponding to said first application being transmitted on a single one of said communications connections, each transmitted portion of a packet being included in a frame, said switching being performed on a frame boundary.

21. The method of claim 20, wherein packet lengths are varied between a preselected minimum packet length and a preselected maximum packet length.

22. The communications method of claim 21, wherein said wireless terminal is a mobile terminal, said at least one other communications network component is a base station and wherein said communications connection is one of a plurality of simultaneously maintained wireless links between said mobile terminal and said base station.

23. The method of claim 20, wherein packets identified as Mobile IP packets are not subject to switching between simultaneously maintained communications connections while at least some other packets are subject to switching between communications connections.

24. The method of claim 23, wherein said plurality of simultaneously maintained communications connections are with the same base station.

25. A wireless terminal comprising:
means for maintaining a plurality of communications connections between the wireless terminal and at least two different receivers connected to a single network node, wherein the single network node is an Internet Protocol (IP) node;
means for monitoring channel conditions on the plurality of communications connections;
means for dynamically determining a packet size to be used as a function of the monitored channel conditions;
means for changing the length of at least one packet using IP fragmentation to generate portions of packets of a first application in response to a change in the monitored channel conditions, the portions of packets being transmitted over at least one of the plurality of communications connection;
means for selecting a first communications connection for transmitting at least some of the portions of packets of the first application, as a function of said monitored channel conditions, from the plurality of communications connections;
means for selecting a second communications connection for transmitting at least some of the portions of packets of the first application, as a function of said monitored channel conditions, from the plurality of communications connections;
means for transmitting a first portion of the at least one packet of the first application using the first selected communications connection; and
means for transmitting a second portion of the at least one packet of the first application using the second selected communications connection.

26. The wireless terminal of claim 25, wherein said plurality of communications connections are wireless connections.

27. The wireless terminal of claim 25, wherein said selecting means further includes a means for selecting a packet boundary, said packet boundary being a boundary corresponding to the end of transmission of one packet and a start of transmission of another packet.

28. The wireless terminal of claim 25, wherein said wireless terminal is used for communicating with one or more access nodes each having one or more of the receivers.

29. The wireless terminal of claim 25, further including:
means for selecting multiple times a communications connection while simultaneously maintaining a single downlink.

30. The wireless terminal of claim 25, further including:
means for determining at least one of: packet content, packet type, packet size and protocol to which the packet corresponds.

31. The wireless terminal of claim 30, wherein said selecting means determines the selected communications connections based upon the packet type.

32. The wireless terminal of claim 25, further including:
means for varying packet length.

33. A wireless terminal device comprising a processor having circuitry configured to:
maintain a plurality of communications connections between said wireless terminal device and at least two different receivers connected to a single network node, wherein the single network node is an Internet Protocol (IP) node, and wherein a communication connection exists between said wireless terminal and each receiver;

monitor channel conditions on the plurality of communications connections;

dynamically determine a packet size to be used as a function of the monitored channel conditions;

change the length of at least one packet using IP fragmentation to generate portions of packets of a first application in response to a change in the monitored channel conditions, the portions of packets being transmitted over at least one of the plurality of communications connections;

select a first communications connection for transmitting at least some of the portions of packets of the first application, as a function of said monitored channel conditions, from said plurality of communications connections;

select a second communications connection for transmitting at least some of the portions of packets of the first application, as a function of said monitored channel conditions, from said plurality of communications connections;

transmit a first portion of the at least one packet of the first application using the first selected communications connection; and transmit a second portion of the at least one packet of the first application using the second selected communications connection.

34. The wireless terminal device of claim 33, wherein said communications connections are physical layer connections.

35. A non-transitory computer readable medium embodying computer executable instructions for controlling a wireless terminal, the instructions being executable to:

maintain a plurality of communications connections between said wireless terminal device and at least two different receivers connected to a single network node, wherein the single network node is an Internet Protocol (IP) node, and wherein a communication connection exists between said wireless terminal and each receiver;

monitor channel conditions on the plurality of communications connections;

dynamically determine a packet size to be used as a function of the monitored channel conditions;

change the length of at least one packet using IP fragmentation to generate portions of packets of a first application in response to a change in the monitored channel conditions, the portions of packets being transmitted over at least one of the plurality of communications connections;

select a first communications connection for transmitting at least some of the portions of packets of the first application, as a function of said monitored channel conditions, from said plurality of communications connections;

select a second communications connection for transmitting at least some of the portions of packets of the first application, as a function of said monitored channel conditions, from said plurality of communications connections;

transmit a first portion of the at least one packet of the first application using the first selected communications connection; and transmit a second portion of the at least one packet of the first application using the second selected communications connection.

36. The non-transitory computer readable medium of claim 35, wherein said communications connections are physical layer connections.

37. A wireless terminal comprising:

a communications interface configured to maintain a plurality of communications connections between the wireless terminal and at least two different receivers connected to a single network node, wherein the single network node is an Internet Protocol (IP) node;

a monitoring module configured to monitor channel conditions on the plurality of communications connections;

a packet size control module configured to:
dynamically determine a packet size to be used as a function of the monitored channel conditions; and
change the length of at least one packet using IP fragmentation to generate portions of packets of a first application in response to a change in the monitored channel conditions, the portions of packets being transmitted over at least one of the plurality of communications connections;

a control module configured to:
select a first communications connection for transmitting at least some of the portions of packets of the first application, as a function of said monitored channel conditions, from the plurality of communications connections; and
select a second communications connection for transmitting at least some of the portions of packets of the first application, as a function of said monitored channel conditions, from the plurality of communications connections; and a transmitter configured to:
transmit a first portion the of at least one packet of the first application using the first selected communications connection; and
transmit a second portion the of at least one packet of the first application using the second selected communications connection.

38. The wireless terminal of claim 37, wherein said communications connections are physical layer connections.

39. A wireless terminal device including a processor having circuitry configured to:

monitor the quality of a communications connection coupling said wireless terminal device to at least one other communications network component;

dynamically determine a packet size to be used as a function of the determined quality of the communications connection;

change the length of packets using IP fragmentation to generate portions of packets transmitted over said communications connection, in response to a change in the dynamically determined packet size, the length of packets being reduced in response to a detected reduction in communications connection quality and being increased in response to detection of an improvement in the quality of the communications connection over which said packets are being transmitted;

select, for purposes of transmitting portions of packets corresponding to a first application, between said plurality of communications connections as a function of the detected quality of the individual communications connections; and switch back and forth between said communications connections for purposes of transmitting portions of packets corresponding to said first application as a function of said selecting operation, each transmitted portion of a packet corresponding to said first application being transmitted on a single one of said communications connections, each transmitted portion of a packet being included in a frame, said switching being performed on a frame boundary.

40. The wireless terminal device of claim 39, wherein said processor being further configured to vary packet lengths between a preselected minimum packet length and a preselected maximum packet length.

41. The wireless terminal device of claim 40, wherein said wireless terminal device is a mobile terminal device, said at least one other communications network component is a base station and wherein said communications connection is one of a plurality of simultaneously maintained wireless links between said mobile terminal device and said base station.

42. A non-transitory computer readable medium embodying computer executable instructions for controlling a wireless terminal in a communications network, the instructions being executable to:
  monitor the quality of a communications connection coupling said wireless terminal to at least one other communications network component;
  dynamically determine a packet size to be used as a function of the determined quality of the communications connection;
  change the length of packets using IP fragmentation to generate portions of packets transmitted over said communications connection, in response to a change in the dynamically determined packet size, the length of packets being reduced in response to a detected reduction in communications connection quality and being increased in response to detection of an improvement in the quality of the communications connection over which said packets are being transmitted;
  select, for purposes of transmitting portions of packets corresponding to a first application, between said plurality of communications connections as a function of the detected quality of the individual communications connections; and
  switch back and forth between said communications connections for purposes of transmitting portions of packets corresponding to said first application as a function of said selecting operation, each transmitted portion of a packet corresponding to said first application being transmitted on a single one of said communications connections, each transmitted portion of a packet being included in a frame, said switching being performed on a frame boundary.

43. The non-transitory computer readable medium of claim 42, wherein the instructions are also executable to vary packet lengths between a preselected minimum packet length and a preselected maximum packet length.

44. The non-transitory computer readable medium of claim 43, wherein said wireless terminal is a mobile terminal, said at least one other communications network component is a base station and wherein said communications connection is one of a plurality of simultaneously maintained wireless links between said mobile terminal and said base station.

45. A wireless terminal in a communications network comprising:
  means for monitoring the quality of a communications connection coupling said wireless terminal to at least one other communications network component;
  means for dynamically determining a packet size to be used as a function of the determined quality of the communications connection and for changing the length of packets using IP fragmentation to generate portions of packets transmitted over said communications connection, in response to a change in the dynamically determined packet size, the length of packets being reduced in response to a detected reduction in communications connection quality and being increased in response to detection of an improvement in the quality of the communications connection over which said packets are being transmitted;
  means for selecting, for purposes of transmitting portions of packets corresponding to a first application, between said plurality of communications connections as a function of the detected quality of the individual communications connections; and
  means for switching back and forth between said communications connections for purposes of transmitting portions of packets corresponding to said first application as a function of said selecting operation, each transmitted portion of a packet corresponding to said first application being transmitted on a single one of said communications connections, each transmitted portion of a packet being included in a frame, said switching being performed on a frame boundary.

46. The wireless terminal of claim 45, wherein packet lengths are varied between a preselected minimum packet length and a preselected maximum packet length.

47. The wireless terminal of claim 46, wherein said wireless terminal is a mobile terminal, said at least one other communications network component is a base station and wherein said communications connection is one of a plurality of simultaneously maintained wireless links between said mobile terminal and said base station.

48. A wireless terminal in a communications network comprising:
  a communications interface coupling said wireless terminal to at least one other communications network component;
  a monitoring module to monitor the quality of a communications connection coupling said wireless terminal to the at least one other communications network component;
  a packet size control module to dynamically determine a packet size to be used as a function of the determined quality of the communications connection and for changing the length of packets using IP fragmentation to generate portions of packets transmitted over said communications connection, in response to a change in the dynamically determined packet size, the length of packets being reduced in response to a detected reduction in communications connection quality and being increased in response to detection of an improvement in the quality of the communications connection over which said packets are being transmitted; and
  an uplink macro-diversity control module to select, for purposes of transmitting portions of packets corresponding to a first application, between said plurality of communications connections as a function of the detected quality of the individual communications connections and to switch back and forth between said communications connections for purposes of transmitting portions of packets corresponding to said first application as a function of said selecting operation, each transmitted portion of a packet corresponding to said first application being transmitted on a single one of said communications connections, each transmitted portion of a packet being included in a frame, said switching being performed on a frame boundary.

49. The wireless terminal of claim 48, wherein packet lengths are varied between a preselected minimum packet length and a preselected maximum packet length.

50. The wireless terminal of claim 49, wherein said wireless terminal is a mobile terminal, said at least one other communications network component is a base station and wherein said communications connection is one of a plurality of simultaneously maintained wireless links between said mobile terminal and said base station.

\* \* \* \* \*